United States Patent [19]
Hashimoto et al.

[11] Patent Number: 5,520,979
[45] Date of Patent: May 28, 1996

[54] VULCANIZED SHEET COMPRISING ANNULAR RUBBER ARTICLES, A METHOD OF AND AN APPARATUS FOR SEPARATING THE ARTICLES FROM THE VULCANIZED SHEET

[75] Inventors: Koichi Hashimoto; Michiyuki Kamiji, both of Osakashi, Japan

[73] Assignee: Nakanishi Metal Works, Co., Ltd., Osaka, Japan

[21] Appl. No.: 436,620

[22] Filed: May 8, 1995

[30] Foreign Application Priority Data

May 10, 1994 [JP] Japan ........................... 6-96005

[51] Int. Cl.⁶ ........................................... B32B 3/02
[52] U.S. Cl. ............................ 428/43; 428/66.4; 206/303
[58] Field of Search ................................. 428/43, 65, 156; 206/303

[56] References Cited

FOREIGN PATENT DOCUMENTS

57-11038  1/1982  Japan.
60-18525  5/1985  Japan.

Primary Examiner—Alexander S. Thomas
Attorney, Agent, or Firm—Armstrong, Westerman, Hattori, McLeland & Naughton

[57] ABSTRACT

A vulcanized sheet S1 having formed therein annular articles P1 is prepared at first, which sheet comprises thick external bridges (16) in a thin annular zone (14) and at regular angular intervals so that the bridges connect an external flash (13) to a body (15) of the sheet. A recess (22) is formed centrally of an inner waste (20) surrounded by each article. Then, a guide lug (34) is inserted in the recess to correctly position the article, before tearing by means of a first punch (35) an inner breakable boundary (26) intervening between the article and the inner waste so as to remove the inner waste from the article. Next, a further guide lug (44) is inserted in a space from which the inner waste has been removed, a die having a bore (31a) of a diameter larger than the article supports the sheet, and finally a second punch (45) tears an outer breakable boundary (12) to separate the article from the sheet.

7 Claims, 11 Drawing Sheets

VULCANIZED SHEET COMPRISING ANNULAR RUBBER ARTICLES, A METHOD OF AND AN APPARATUS FOR SEPARATING THE ARTICLES FROM THE VULCANIZED SHEET

BACKGROUND OF THE INVENTION

1. Field of the Invention

The present invention relates to a vulcanized sheet comprising annular rubber articles such as bearing seals, a method of and an apparatus for separating the articles from the vulcanized sheet.

2. Prior Art

Each of the prior art rubber articles of this kind consists of a rubber ring reinforced with a metal ring secured therein. The rubber ring is made of an elastomer such as a synthetic rubber. The annular rubber articles are obtained by separation from a vulcanized sheet. Typically, the sheet is an integrally rubber sheet provided by the reinforcing metal rings into the elastomer by vulcanizing compression molding.

Figure 10:
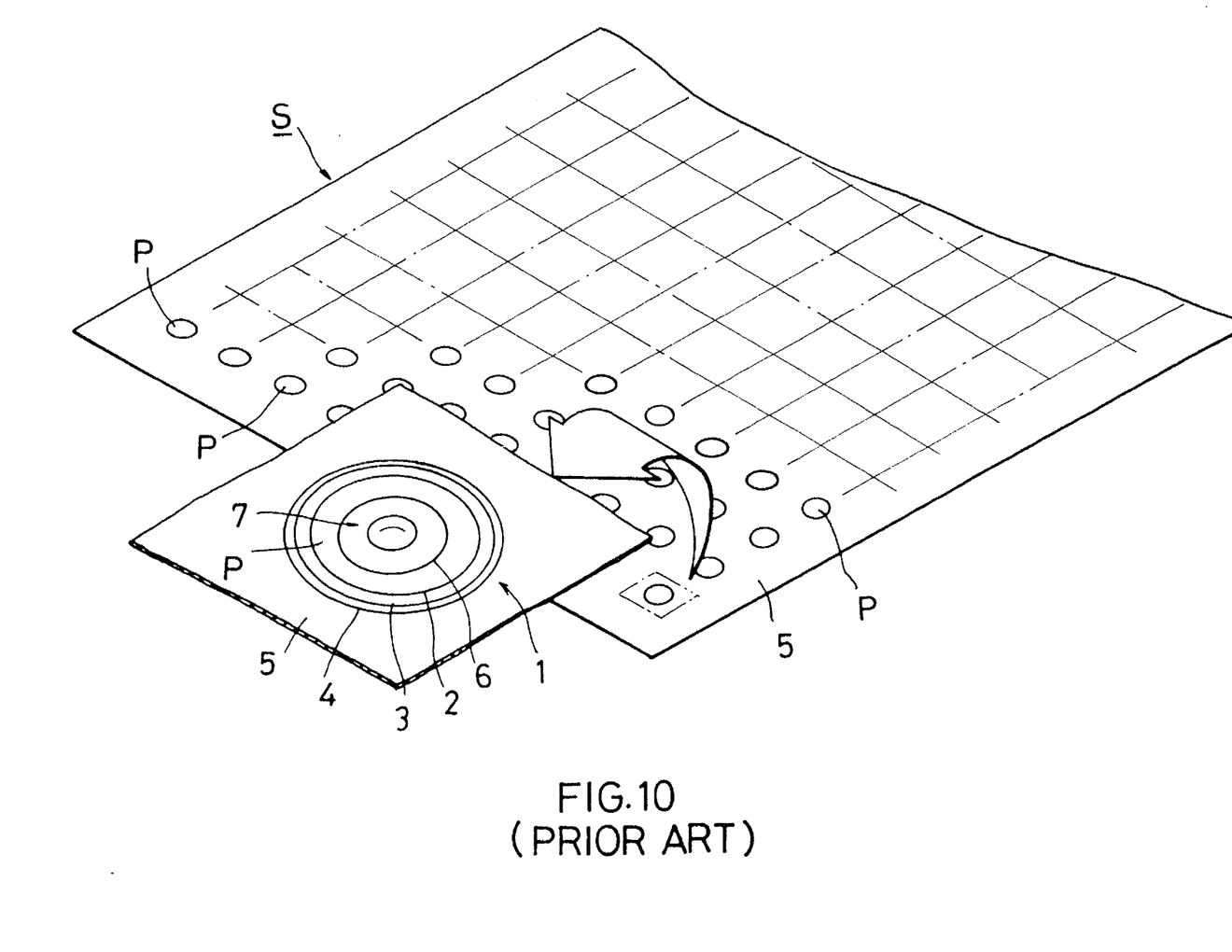
FIG. 10 is a perspective view of a prior art vulcanized sheet, wherein one of its areas where annular articles are formed is enlarged.
Figure 11:
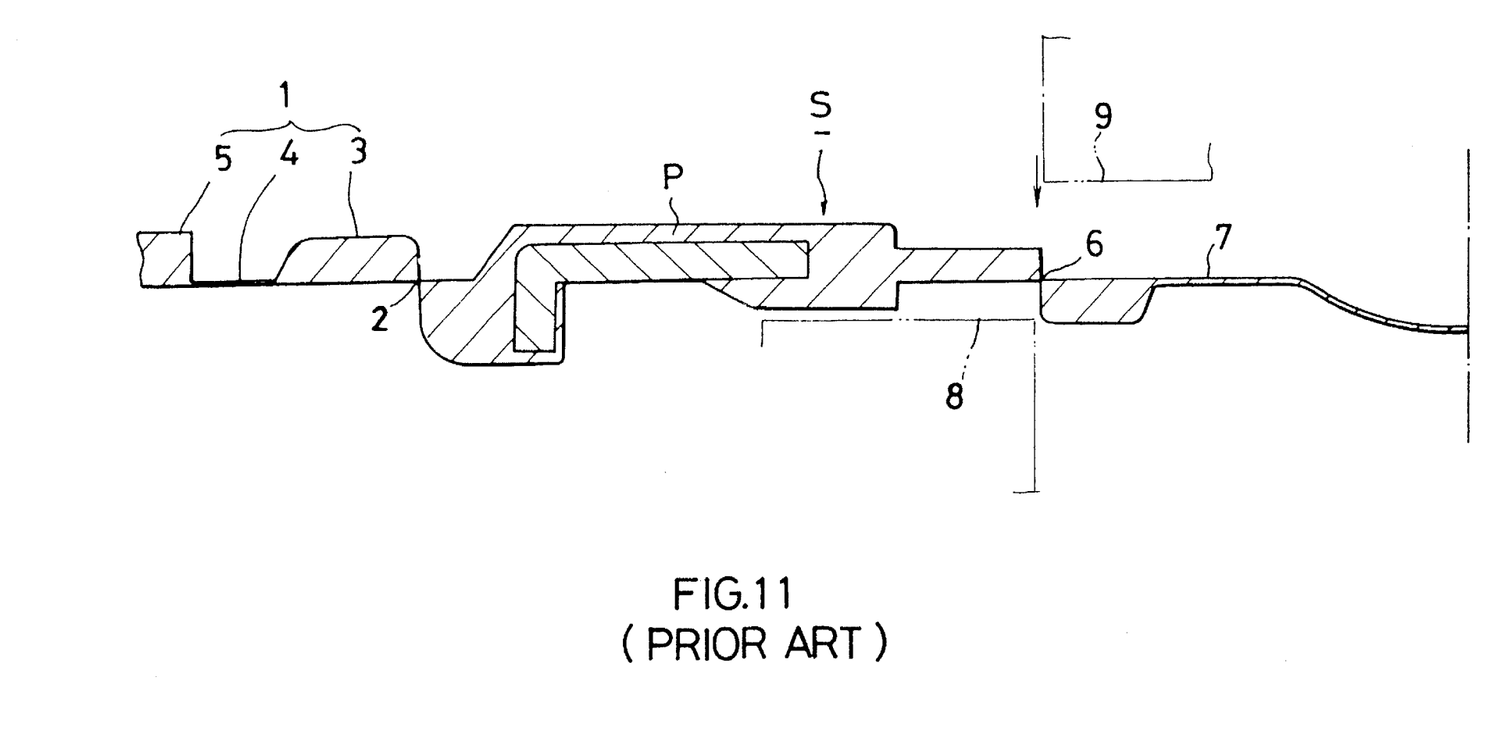
FIG. 11 is a cross section of a half of the one area in the prior art vulcanized sheet.

An example of the vulcanized sheet 'S' shown in FIG. 10 comprises annular articles 'P' arranged in rows and columns. An outer waste 1 surrounds each article 'P', and an inner waste 7 is enclosed therewith. Thus, the annular article 'P' is integral with both the areas 1 and 7. FIG. 11 shows that the outer waste 1 consists of an external flash 3, an outermost thin and annular zone 4 and a body 5 of the sheet. This body 5 surrounds the annular zone 4, and an outer break line 2 is a boundary formed between the external flash 3 and an outer periphery of the annular article 'P'. The zone 4 formed as a thin bottom of an annular groove is a zone which has prevented a molding pressure from escaping during vulcanization of the sheet. On the other hand, an inner break line 6 intervenes between the annular article 'P' and the inner waste 7.

It has however been inefficient for any worker to manually tear the annular articles 'P' one by one from the vulcanized sheet 'S'. It is another problem that some of those manually separated articles possibly have their metal rings bent, thereby causing deformation of said articles. The hand of the worker likely soils the annular articles when he tears them off the sheet, further lowering the quality of those articles.

The extremely thin zone 4 surrounding the external flash 3 is too weak to protect each annular article 'P' from an unintended slipping off. Some annular articles 'P' will possibly be severed from the vulcanized sheet 'S', when the sheet is removed from a mold or is transported. It is a matter of course that such a loss lowers the yield of annular articles per sheet.

Certain apparatuses have recently been proposed so that the annular articles could automatically be torn off the vulcanized sheet, as disclosed for example in the Japanese Patent Publication No. 60-18525 or in the Unexamined Patent Publication No. 57-11038.

The apparatuses comprise each a punching device, a blanking device and a transporting device. The vulcanized sheet 'S' will be carried by and along the transporting device so that the sheet's region where one of annular articles 'P' is formed does take a correct position on the punching device. As the phantom lines in FIG. 11 indicate, a die 8 of this punching device will support the lower face of said article 'P' when a punch 9 strikes the upper face of said article. After the inner waste 7 is thus removed, the region advances to the blanking device where the external flash 3 is supported by a similar die when another punch strikes the article 'P' out of said sheet.

Even if any of the extremely thin zones 4 in the vulcanized sheet 'S' is damaged to a slight extent that the annular article 'P' would not slip off, this article may however be offset relative to the surface of said sheet. The shearing die and punch included for example in the punching device for removing the inner wastes 7 will thus fail to exactly cut the necessary portions. The cutting along the inner break line 6 will not be assured for that displaced article 'P', but a portion thereof or of the inner waste 7 adjacent to the break line may be cut. The annular articles having their portions erroneously cut away or having unremoved flashes do not qualify as acceptable good products.

Such a poor stability in position of the annular articles 'P' will cause a more serious problem in a case wherein one punching or blanking operation separates at once a plurality of said articles from one vulcanized sheet. There has been a possibility that the punch could not sever any articles at all, thus lowering productivity. In order to avoid those troubles, extraordinarily accurate and complicated parts and structures have been necessary for the punches and dies to correct the position of each annular article.

OBJECTS AND SUMMARY OF THE INVENTION

An object of the present invention is thus to provide a vulcanized sheet comprising annular rubber articles, a method of and an apparatus for separating the articles from the vulcanized sheet, wherein the sheet, the method and the apparatus all designed to resolve the drawbacks inherent in the prior art are adapted to manufacture good products of an acceptable quality at an improved efficiency and yield.

From a first aspect of the invention, a vulcanized sheet comprises: annular rubber articles separable from the sheet and distributed over a plane body of the sheet; an outer waste formed around each article; an inner waste formed inside the article; an outer breakable boundary between the outer waste and an outer periphery of the article; the outer waste consisting of: an external flash surrounding the outer boundary; a thin annular zone intervening between the external flash and the body and being of such a thickness as preventing a vulcanization pressure, from escaping; and thick external bridges formed integral with the body and the flash and disposed in and along the annular zone at regular angular intervals; an inner breakable boundary between the inner waste and an inner periphery of the article; and a recess formed centrally of the inner waste and engageable with a positioning means.

From a second aspect of the present invention, a method of separating annular rubber articles from a vulcanized sheet does comprise the steps of:

preparing the vulcanized sheet which comprises: the annular rubber articles separable from the sheet and distributed over a plane body of the sheet; an outer waste formed around each article; an inner waste formed inside the article; an outer breakable boundary between the outer waste and an outer periphery of the article; the outer waste consisting of: an external flash surrounding the outer boundary; a thin annular zone intervening between the external flash and the body and being of such a thickness as preventing a vulcanization pressure from escaping; and thick external bridges formed integral with the body and the flash and disposed in and along the annular zone at regular angular intervals; an inner breakable boundary between the inner waste and an inner periphery of the article; and a recess formed centrally of the inner waste and engageable with a positioning means;

then removing the inner waste out of each annular article, by placing on a first die each of portions where the annular articles are formed in the vulcanized sheet, the first die having formed therein a bore, subsequently fitting a guide lug as the positioning means in the recess of each annular article so as to position the portion correctly relative to the first die, before gripping the portion with and between the first die and a first thruster, and thereafter causing a first punch to force the inner waste into the bore so that the inner waste is torn off the article at the inner breakable boundary, wherein the first punch having an outer diameter substantially corresponding to but slightly smaller than an inner diameter of the article; and finally separating each annular article out of the vulcanized sheet, by placing on a second die each of the portions where the annular articles having their inner wastes removed are arranged in the vulcanized sheet, the second die having formed therein a further bore whose diameter substantially corresponds to but is slightly smaller than an outer diameter of the article, subsequently fitting a further guide lug in a space from which the inner waste has been removed so as to position the portion correctly relative to the second die, before gripping the external flash with and between the second die and a second thruster, and thereafter causing a second punch to force the annular article into the further bore so that the annular article is torn off the vulcanized sheet at the outer breakable boundary.

From a third aspect of the invention, an apparatus for separating annular rubber articles from a vulcanized sheet is provided, wherein the sheet comprises the annular rubber articles separable from the sheet and distributed over a plane body of the sheet; an outer waste formed around each article; an inner waste formed inside the article; an outer breakable boundary between the outer waste and an outer periphery of the article; the outer waste consisting of: an external flash surrounding the outer boundary; a thin annular zone intervening between the external flash and the body and being of such a thickness as preventing a vulcanization pressure from escaping; and thick external bridges formed integral with the body and the flash and disposed in and along the annular zone at regular angular intervals; an inner breakable boundary between the inner waste and an inner periphery of the article; and a recess formed centrally of the inner waste and engageable with a positioning means. The apparatus comprises: a first section designed to remove the inner waste out of each annular article; a second section to separate each annular article from the vulcanized sheet; and a transporting device for feeding portions of said sheet to the first section and then to the second section, the portions being regions where the articles are arranged. The first section comprises: a substantially cylindrical first thrust capable of pressing an upper surface of each annular article; a first punch slidably inserted in the cylindrical first thrust and having a lower face capable of protruding downward beyond a lower face of the first thrust; the first punch being of an outer diameter smaller than an inner diameter of the annular article; a guide lug formed centrally of the lower face of the first punch such that the recess of the annular article can fit on the guide lug so as to cause the annular article to take a correct position relative to the first punch; and a first die facing the lower face of the first punch so as to support the annular article at a lower surface thereof and having a bore capable of receiving the first punch. The second section similarly comprises: a substantially cylindrical second thrust capable of pressing an upper surface of the external flash of each annular article; a second punch slidably inserted in the cylindrical second thrust and having a lower face capable of protruding downward beyond a lower face of the second thrust; a further guide lug formed centrally of the lower face of the second punch such that a space from which the inner waste has been removed can fit on the further guide lug so as to cause the annular article to take a correct position relative to the second punch; and a second die facing the lower face of the second punch so as to support the external flash at a lower surface thereof and having a further bore that is capable of receiving the second punch and has a diameter greater than an outer diameter of the annular article.

In the present invention, the term 'annular' is meant to include an elliptic shape, a polygonal shape and any other closed loops, in addition to a really round shape.

It is an important feature that the thick external bridges are formed integral with the body and the external flash and disposed in and along the thin annular zone intervening between the external flash and the vulcanized sheet body. Those bridges are of such a thickness as preventing the vulcanization pressure from escaping and are effective to protect said annular zone from being unintentionally broken. Thus, any annular articles will not slip off the vulcanized sheet when the latter is taken off a mold or transported, thereby improving production efficiency. Further, the thin annular zones thus protected from breakage enable a higher accuracy in positioning the annular articles in the apparatus proposed hereinabove, so that the annular articles free from any defect in shape or dimension can now be produced.

The recess formed in each inner waste is engageable with the guide lug makes it possible to exactly position and remove each inner waste. Each annular article is also positioned correctly in a similar manner when it is torn off the vulcanized sheet. Such a precise positioning of those inner wastes and annular articles contributes to a higher quality of products.

Since the outer diameter of the first punch is smaller than the inner diameter of each annular article, and since the diameter of the further bore formed in and axially of the second die is larger than the outer diameter of said article, neither the inner waste nor the annular article itself will erroneously be cut by the shearing punches and dies. In other words, only the inner and outer breakable boundaries will be torn, even if a slight misalignment would take place between any punch and the article. Therefore, a considerably rough dimension will be allowed in manufacture of the punches, dies and other members, and a simpler and less expensive apparatus may be employed.

Further, an easier and not extremely precise positioning will be permitted so that the finished annular articles of a higher quality are obtained more efficiently.

Other objects and advantages will become apparent from the embodiments exemplified below, and it will be understood that those embodiments may be modified in any manner within the spirit and scope of the present invention.

DESCRIPTION OF THE PREFERRED EMBODIMENTS

Figure 1:
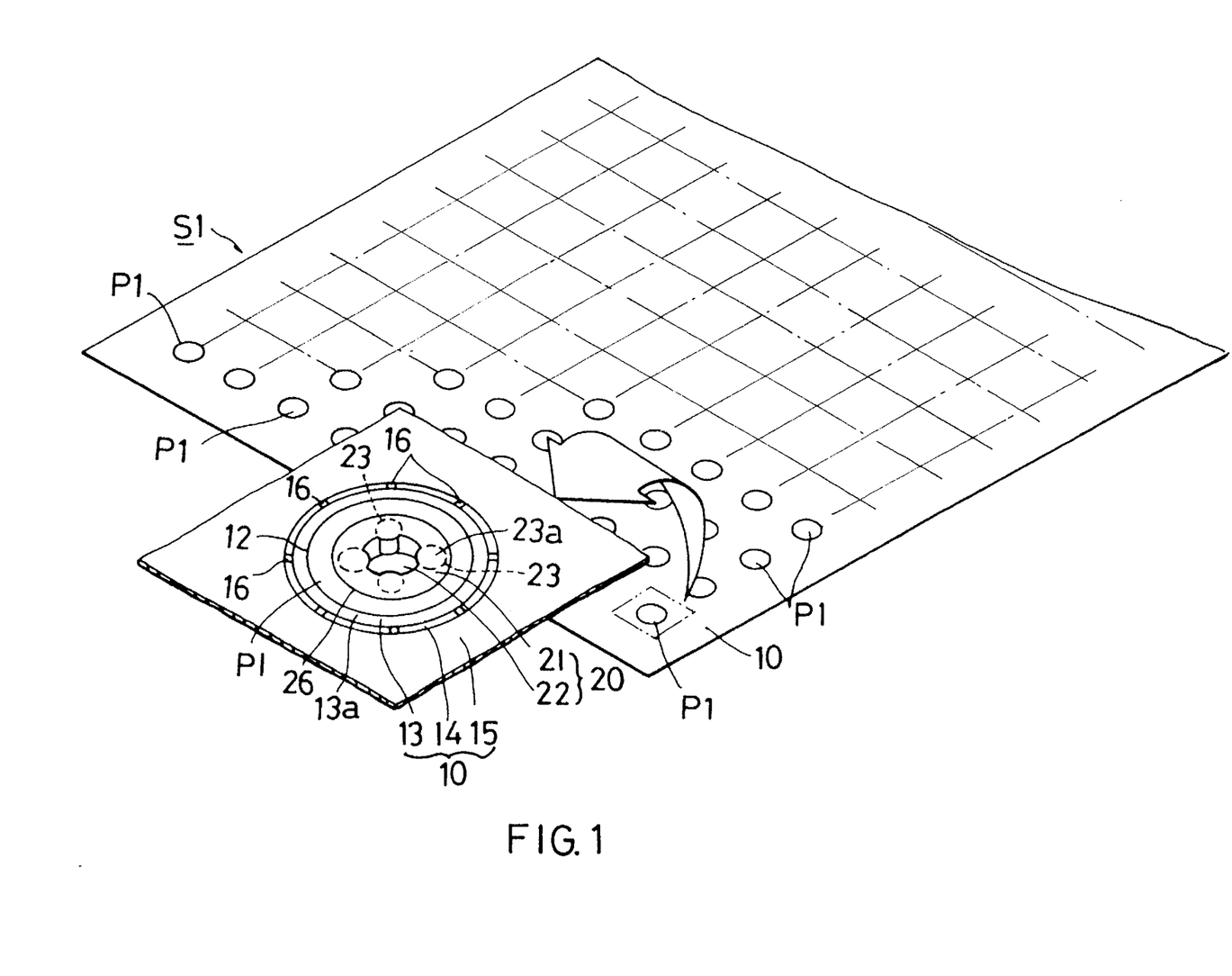
FIG. 1 is a perspective view of a vulcanized sheet having areas and provided in an embodiment of the invention, wherein one of the areas where annular articles are formed is enlarged.

The present invention will now be described in more detail referring to an embodiment, in which a vulcanized sheet S1 as shown in FIG. 1 will be fed to an apparatus shown in FIG. 4 so that annular articles P1 formed in the vulcanized sheet are separated therefrom.

Figure 2:
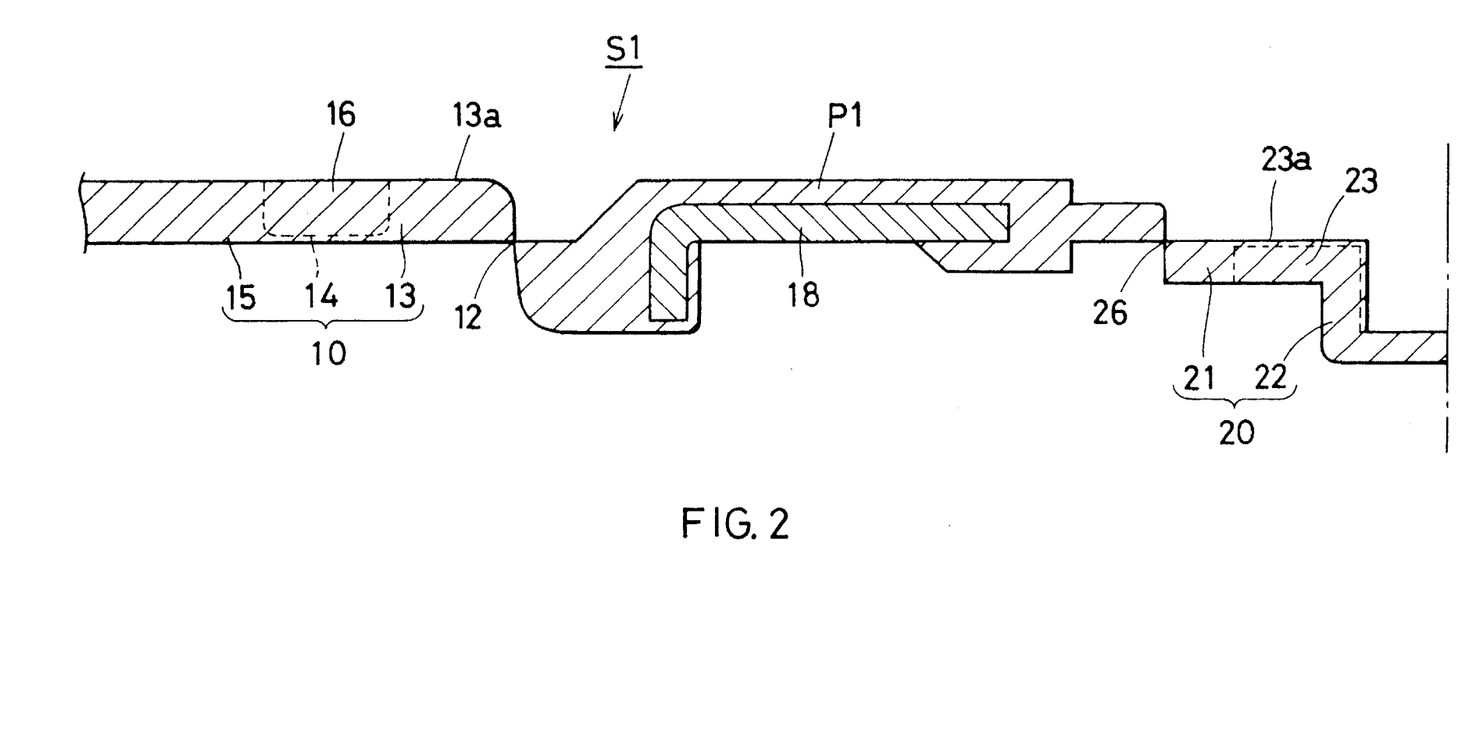
FIG. 2 is a cross section of a half of the one area in the embodiment.

The vulcanized sheet S1 is an integral piece produced by compression vulcanization of a synthetic rubber or the like material. The annular articles P1 arranged in rows and columns, outer wastes 10 each surrounding the annular article P1 and inner wastes 20 each surrounded by the annular article P1 are included in the vulcanized sheet S1, as shown in FIGS. 1 and 2. Each of the annular articles P1 include a metal ring 8 as a reinforcing member.

The outer waste 10 of each annular article P1 consists of an external flash 13, a thin annular zone 14 and a plane body 15 surrounding this zone 14 of the vulcanized sheet. The flash 13 is connected by an outer breakable boundary 12 to the annular article. The thin zone 14 surrounding the flash is of such a thickness as to prevent the pressure of the molded material from escaping during the compression vulcanization thereof. An upper surface 13a of the external flash 13 is flat in this embodiment.

Figure 3A:
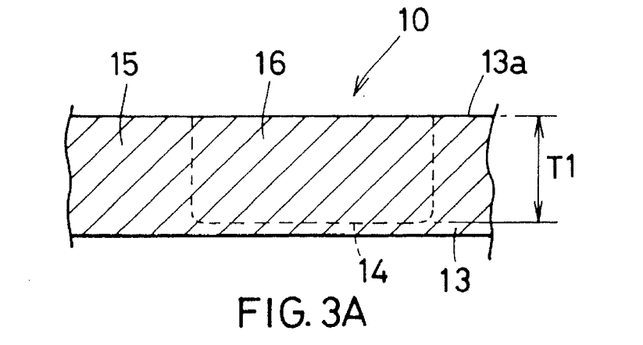
FIG. 3A is an enlarged cross section of an external bridge and other portions formed around the annular article.
Figure 3B:
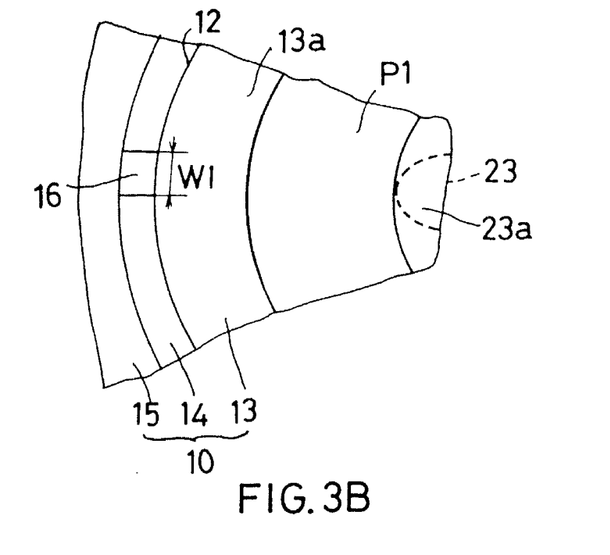
FIG. 3B is an enlarged plan view corresponding to FIG. 3A.

Eight thick external bridges 16 are formed on and integral with the thin annular zone 14. Those external bridges 16 are disposed at regular angular intervals around the annular article. The external flash 13 is thus connected in a stable manner to the plane body 15 by such bridges 16 thicker and more rigid than the annular zone. As shown in FIGS. 3A and 3B, each bridge 16 is of a width W1 and thickness T1 that are designed in view of the diameter of the annular article P1. In this embodiment, a preferable width W1 is 0.5–5.0 mm and a preferable thickness T1 is 0.3—1.0 mm.

The number of those external bridges 16 may be two or more, though five or more bridges will preferably be formed to stabilize the angular position of article P1 relative to the sheet.

On the other hand, an inner waste 20 consists of an internal flash 21 and a positioning recess 22 formed centrally thereof. The internal flash is connected by an inner breakable boundary 26 to an inner periphery of the annular article P1. The recess 22 is U-shaped in cross section and has a bottom 22A thicker and more rigid than the boundary 26.

Four thick internal blocks 23 formed integral with the inner waste 20 are arranged at regular and angular intervals. Each block 23 extends from a region near the inner boundary 26 and along and inside the side wall of the recess 22, so as to terminate at the bottom 22A thereof. Those internal blocks are thicker and more rigid than said inner breakable boundary.

Figure 3C:
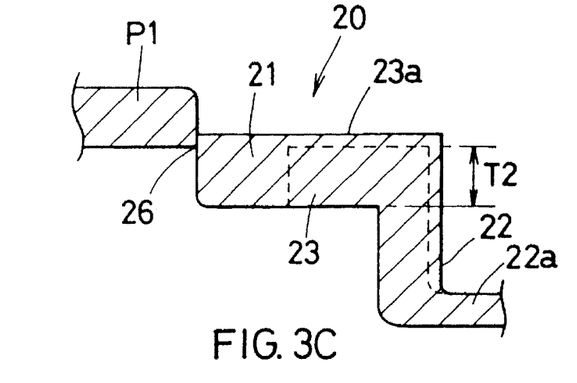
FIG. 3C is an enlarged cross section of an inner waste surrounded by the annular article.
Figure 3D:
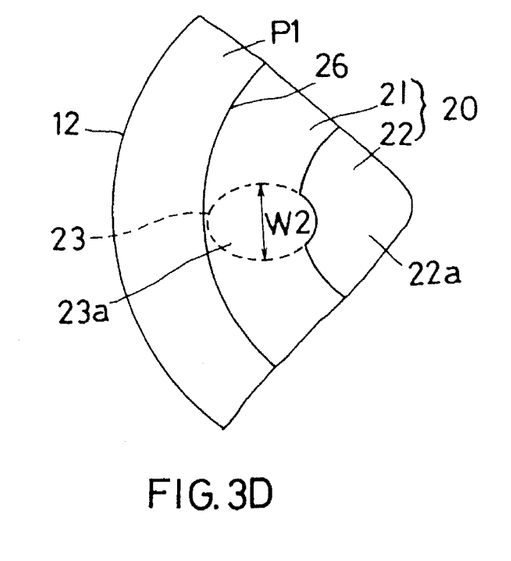
FIG. 3D is an enlarged plan view corresponding to FIG. 3C.

As will be seen in FIGS. 3C and 3D, each block 23 is of a width W2 and thickness T2 that are designed in consideration of the diameter of the annular article P1. However in this embodiment, a preferable width W2 is 0.5–5.0 mm and a preferable thickness T2 is 0.3–1.0 mm.

The number of those internal blocks 23 may be two or more, though three or more blocks will preferably be formed to render more exact the positioning of article and the removing of inner waste.

Upper surfaces 23A of the internal blocks 23 in this embodiment are flat and flush with each other.

Figure 4:
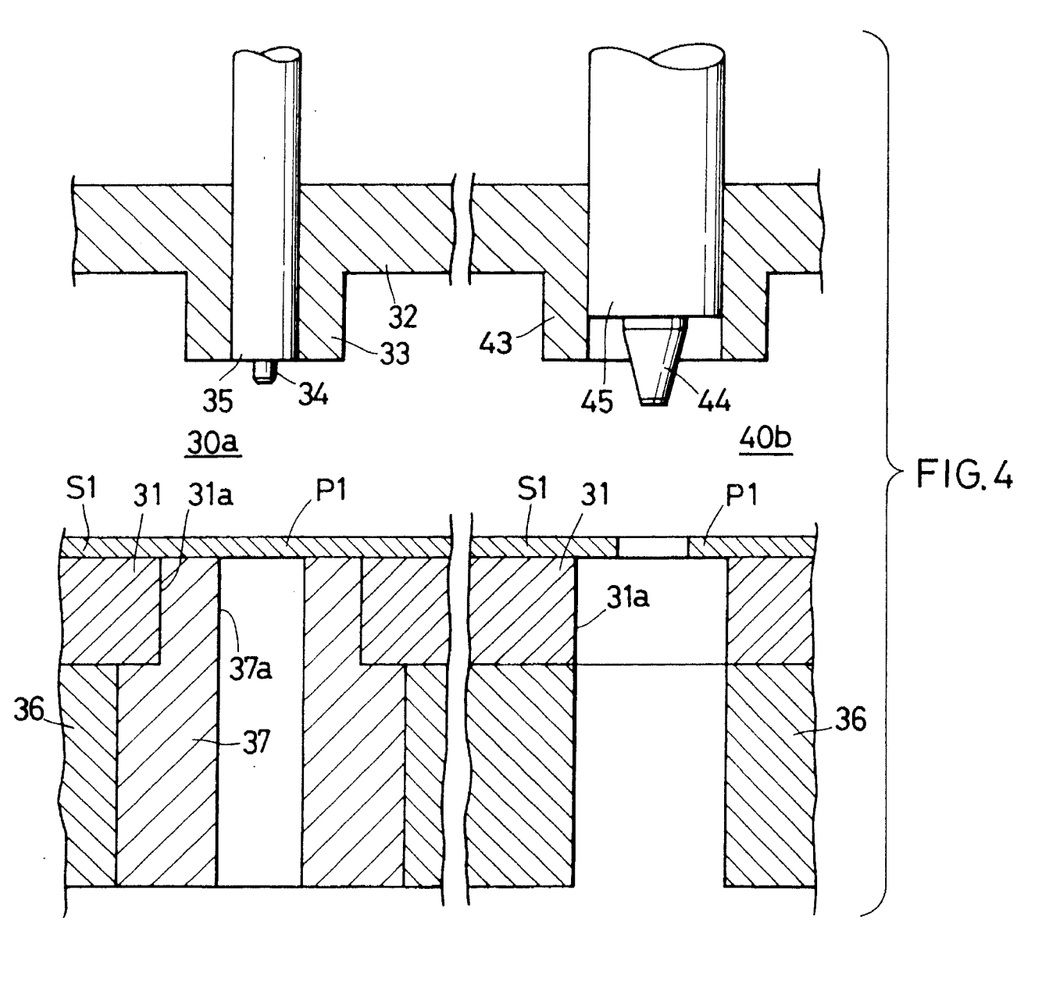
FIG. 4 is a cross section of a part of an apparatus provided in a further embodiment, the part including a first section for removing the inner waste as well as a second section for separating the annular article from the vulcanized sheet.
Figure 5A:
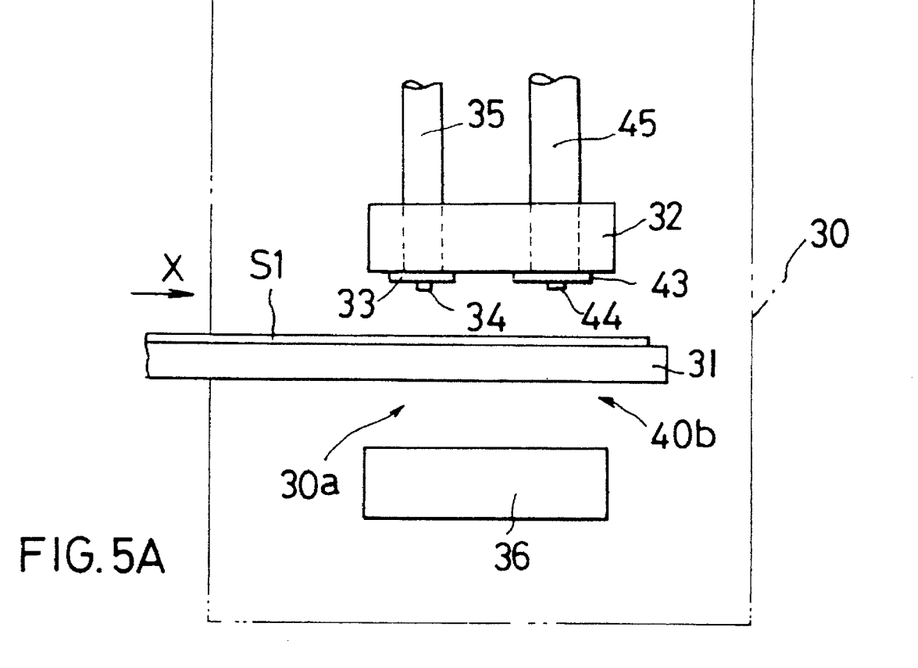
FIG. 5A is a schematic illustration showing the vulcanized sheet which has just been transported to a necessary station in the apparatus.

FIGS. 4 and 5A illustrate an apparatus provided in a further embodiment to separate each annular article P1 from the vulcanized sheet S1. This apparatus comprises a first section 30A for punching, a second section 40B for blanking and a sheet holding plate 31. The first section is constructed to remove each inner waste 20 from the sheet region where the article P1 is formed. The second section is designed to subsequently separate the article from the vulcanized sheet S1. This sheet is carried by the sheet holding plate 31 so that the sheet region is transported to the first and second sections 30A and 40B in this order.

Figure 8A:
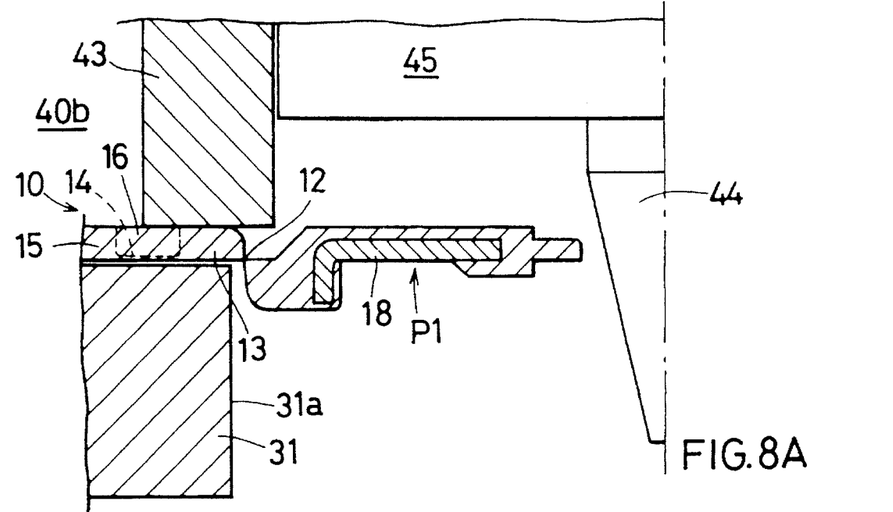
FIG. 8A is also a cross section of the half of the annular article which is being positioned by one of the guide lugs in the second section.

The sheet holding plate 31 extending along a transportation line in the body 30 of this apparatus is perforated to have round holes 31A (see FIG. 8A). Those holes will be aligned with the annular articles P1 formed in the vulcanized sheet S1 carried by said sheet holding plate. Each hole 31A has a diameter greater than the outer diameter of article P1, but smaller than that of the external flash 13.

Therefore, an upper periphery of each round hole 31A penetrating the plate 31 serves also as a die for blanking in the second section in this embodiment, with said hole functioning as a bore formed through the die. As mentioned above, the round holes 31A each have a diameter greater than the outer diameter of each annular article P1. In detail, a clearance between the peripheries of the hole 31A and the article P1 pressed by a further punch 45 for blanking (detailed below) may preferably be 0.1–5.0 mm around said article, more preferably 0.2–1.5 mm and most preferably about 0.5 mm.

Figure 5B:
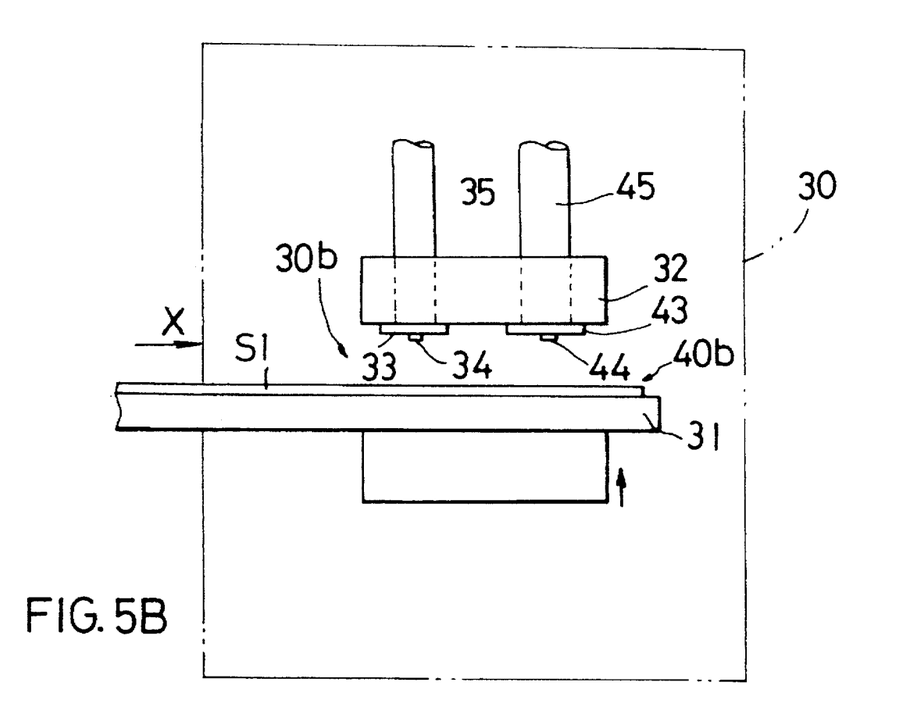
FIG. 5B is also a scheme of said sheet supported on a die holder lifted to its upper position.

As seen in FIGS. 4, 5A and 5B, the sheet holding plate 31 can move in a horizontal direction 'X' and at a given pitch to transport the vulcanized sheet S1, when a die holder 36 (described later) is at its lower retracted position. Thus, the sheet regions where the articles are formed will be supplied to the first section 30A and the second section 40B in a sequential manner.

A liftable thrust holder 32 is disposed above the transportation line within the body 30 of the apparatus in this embodiment. A first cylindrical thrust 33 having a vertical axis is held by the holder 32, so that an upper surface of each article P1 in the sheet S1 is retained in position with the thrust. A first punch 35 slidably held in an axial bore of this cylindrical thrust 33 is descendable so that the lower surface of this punch protrudes downwards beyond the lower face of thrust.

The first punch 35 is of an outer diameter smaller than the inner diameter of annular article P1. Thus, a clearance of 0.1 mm or more, more preferably about 0.5 mm, is ensured between the inner periphery of said article and the outer periphery of the punch pressing the inner waste 20. A greater clearance will be allowed in proportion to the dimension of article P1, so that any upper limit is not given here.

A guide lug 34 protrude centrally of and downwards from the lower face of the punch. This lug is engageable with the recess 22 formed centrally of the inner waste of each annular article.

The die holder 36 is disposed below the transportation line within the apparatus body 30. A substantially cylindrical first die 37 for punching is retained by this die holder and at a portion thereof for the first section 30A. A bore 37A formed axially of this first die and facing the first punch 35 is adapted to receive same for removing the inner waste. The first die 37 cooperates with the first thrust 33 to grip therebetween the vulcanized sheet S1 at its region where each article P1 is located. The first die will penetrate the round hole 31A in the sheet holding plate 31 so that the upper face of said die is flush with said plate, when the die holder 36 is raised.

As shown in FIG. 4, a second cylindrical thrust 43 having a vertical axis is also held by the thrust holder 32, so that an upper surface of the external flash 13 of each article P1 in the sheet S1 is retained in position with the thrust.

Similarly, the second punch 45 slidably held in an axial bore of this cylindrical thrust 43 is capable of descending. The lower surface of this punch will then protrude downwards beyond the lower face of thrust, when each annular article P1 is separated from the vulcanized sheet S1.

A further guide lug 44 protrudes downwards centrally of the lower face of the second punch 45 so as to be engageable with a space from which the inner waste has been removed.

It is a matter of course that several drive means and mechanism are incorporated in or accompany the apparatus described hereinabove, so that the drivable parts and members included therein can automatically operate in sequence and in response to a command signal which an operator will input.

In operation, those parts and members will work to separate the annular articles from the vulcanized sheet in the following manner.

At first, the vulcanized sheet S1 will be placed on the sheet holding plate 31. Guide pins may preferably protrude from this plate so that the sheet having holes corresponding to those pins can easily and correctly be positioned.

Figure 7A:
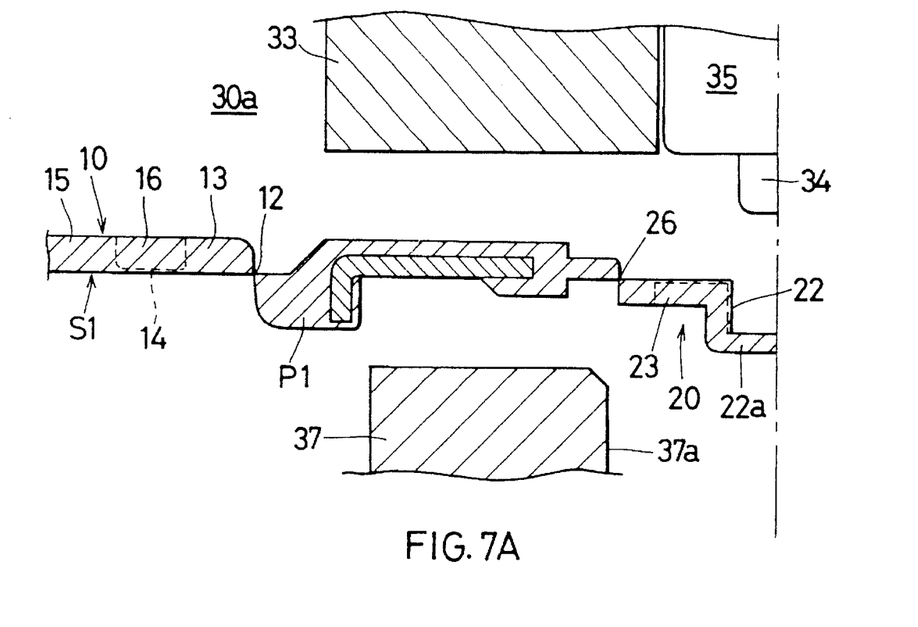
FIG. 7A is a cross section of a half of the annular article included in the sheet which has just been placed at the necessary position in the first section.

By switching on the apparatus, the plate 31 will start to transport the sheet S1 a given distance, whereby a first one of the sheet regions where the annular articles are located takes a correct position relative to the first section 30a as seen in FIGS. 5A and 7A. Then, the die holder 36 will ascend so that the first die 37 supports the article P1.

Next, the first punch 35 will descend to place the guide lug 34 in the recess 22 and between the internal blocks 23 formed therein. The first sheet region will take a correct position relative to the first punch 35 in this manner. Even if the region had been offset a little away from the punch, the guide lug 34 put in between the rigid and thick internal blocks 23 will forcibly adjust the position of said region, without making the blocks and/or recess 22 bend or sway.

Figure 6A:
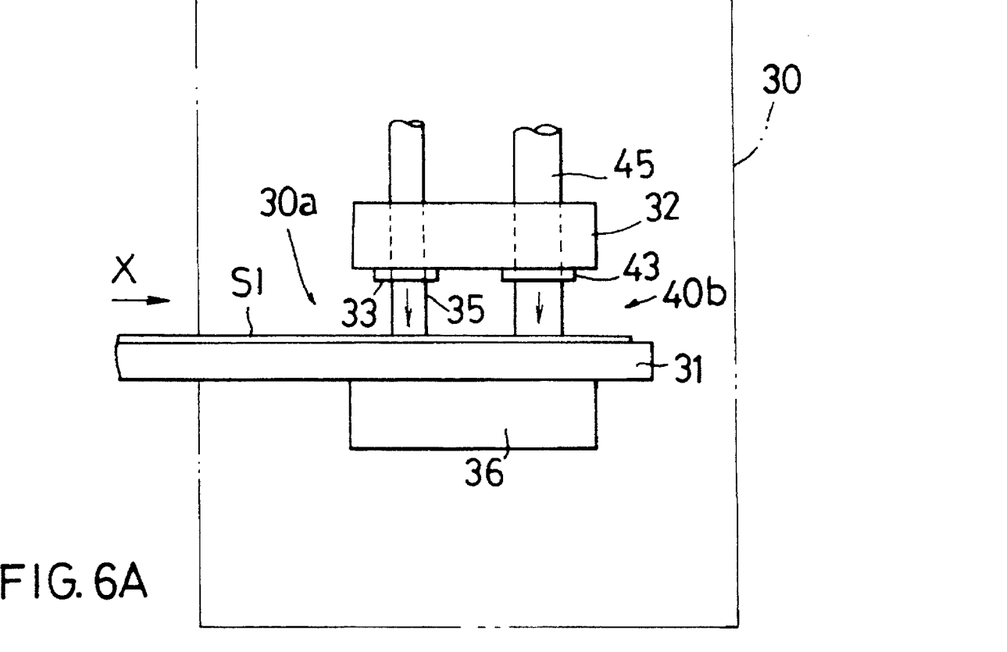
FIG. 6A also schematically shows the vulcanized sheet whose annular articles are being positioned by means of guide lugs incorporated in the apparatus.
Figure 6B:
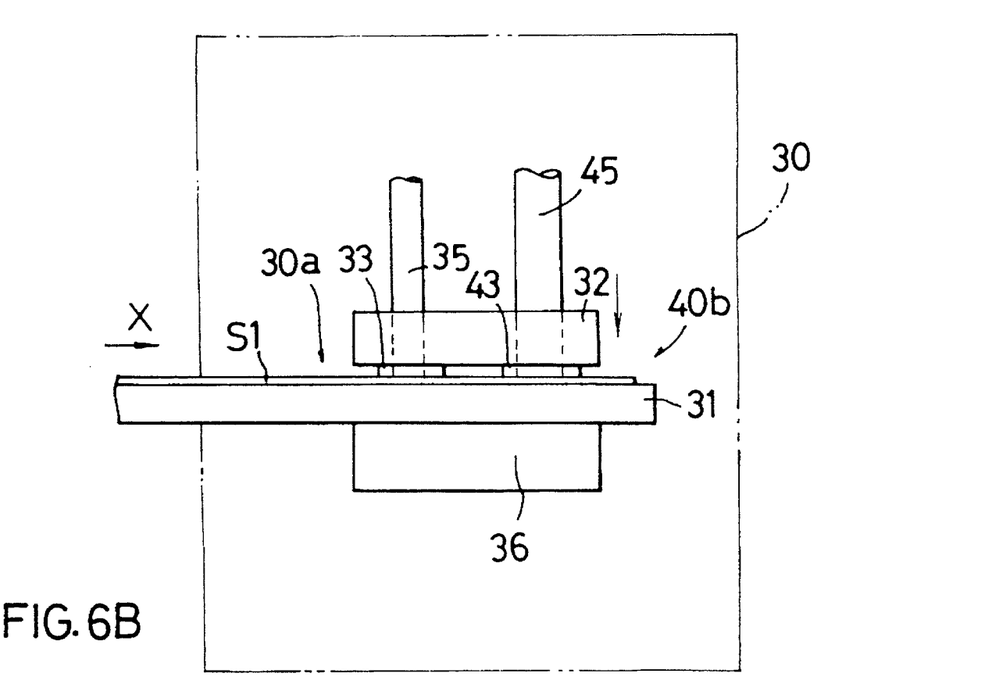
FIG. 6B shows the sheet whose upper face is pressed by thrusts.

After positioning the sheet region, the first thrust 33 will descend to grip the annular article P1 between said thrust and the die 37, as shown in FIG. 6B.

Figure 7B:
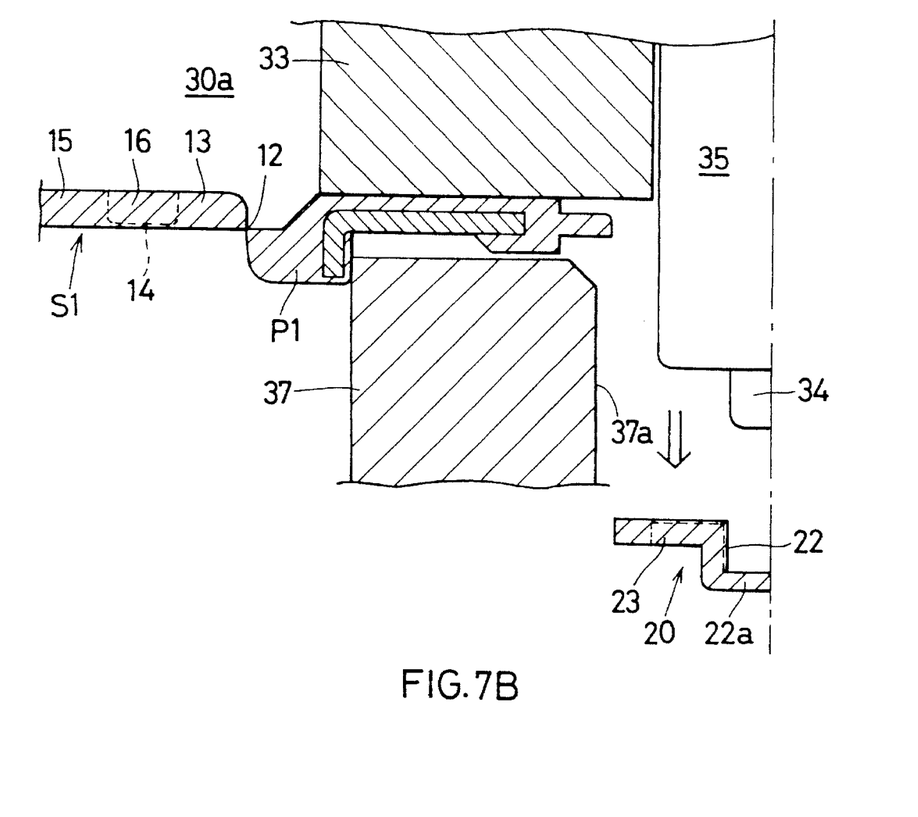
FIG. 7B is a cross section corresponding to FIG. 7A, but the inner waste has just been removed from the article by one of the punches.

Subsequently, the first punch 35 will rush towards the inner waste 20 so as to force the internal blocks 23 into the bore 37A. The inner breakable boundary 26 will thus be torn to sever the inner waste from the annular article. By virtue of the proper clearance between the outer periphery of punch and the inner periphery of article P1 as well as the sufficient thickness of the internal blocks 23 and the recess bottom 22A, only said boundary 26 will be broken without damaging the inner waste between the shearing peripheries of the punch and the bore.

Since the upper surfaces 23A of all the internal blocks 23 are flat and included in the same horizontal plane, the thrust of the punch 35 will be applied evenly to the whole surface of inner waste 20 and the inner waste will smoothly be cut off the sheet.

Upon removal of the inner waste 20, the punch 35 and the thrust 33 will be raised and the die 37 lowered, to respectively take their home positions.

If certain resilient tongues are formed to protrude from the wall surface of the die bore 37A, then the cut waste will surely be prevented from accompanying the ascending punch 35.

After the step of removing the inner waste from the first sheet region has finished, the vulcanized sheet S1 will travel again such a distance that the first region comes into the second section 40B, with the second region simultaneously entering the first section 30A.

At the same time as the removing of inner waste from the second region, the annular article will be separated from the first region of vulcanized sheet S1 in the following manner.

The die holder 36 will ascend again to support the sheet S1, as shown in FIG. 5B. Next, the second punch 45 in the second section 40B will descend to put the further guide lug 44 in a space from which the inner waste has been removed, as seen in FIGS. 6A and 8A. Even if the article P1 had been offset a little away from the second punch 45, the guide lug 44 put in the space will forcibly and automatically correct the position of the region where the article to be separated is located.

After having positioned the sheet region, the second thrust 43 will descend to grip the external flash 13 between said thrust and the upper rim of the round hole 31A formed through the sheet holding plate 31, as shown in FIG. 6B. Since the upper surface 13A of said flash is flat, the flash is pressed evenly against the rim of said hole. If the thrust 43 has at its lower face a circular protrusion, the latter will bite the external flash 13 so as to more surely hold it in place.

Figure 8B:
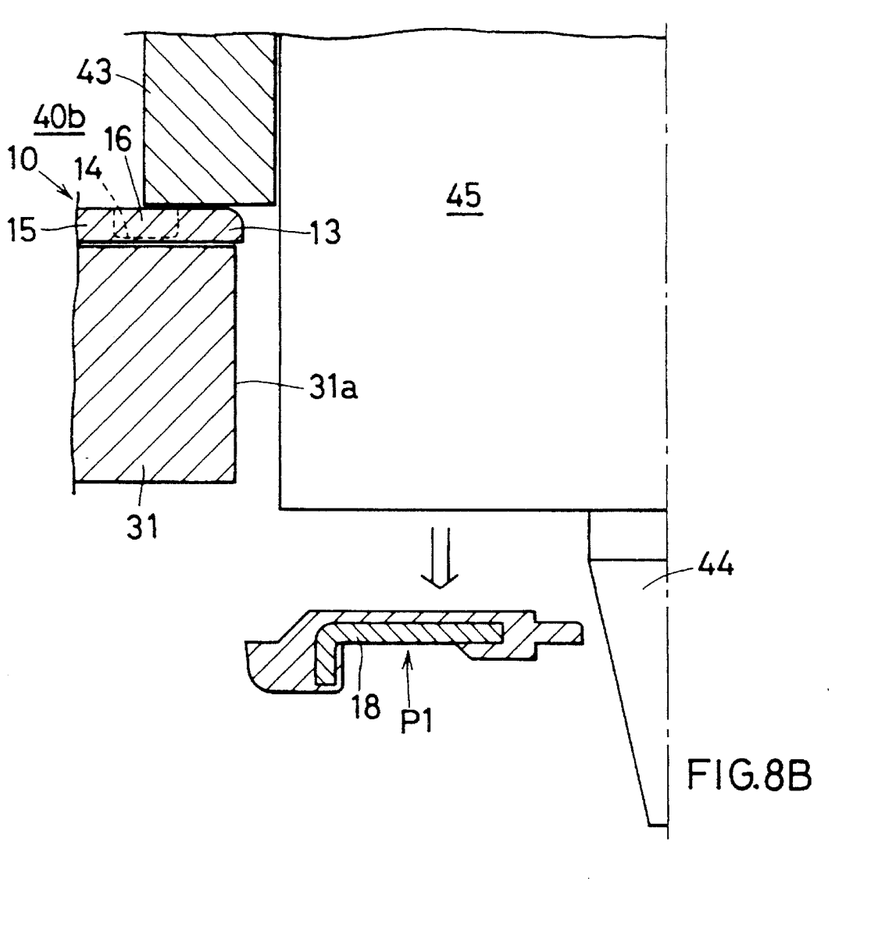
FIG. 8B is a cross section corresponding to FIG. 8A, but the annular article has just been removed from said vulcanized sheet.

Subsequently, the second punch 45 will rush towards the annular article P1 so as to force same into the hole 31A. The outer breakable boundary 12 will thus be torn to sever the article from the vulcanized sheet. By virtue of the proper clearance between the periphery of hole 31A and the outer periphery of article P1, only said boundary 12 will be broken without damaging the article between the shearing peripheries of the punch and the hole.

The article P1 thus separated from said sheet will be collected in a proper receptacle, and the punch 45 and the thrust 43 will be raised to their home positions.

In this way, the inner waste from the second region will be removed from the second sheet region at the same time as the annular article at the first region is separated from the vulcanized sheet S1.

After the step of removing the inner waste from the second sheet region at the same time as the separation of the annular article from the first region of vulcanized sheet S1, the sheet will travel again so that the second region comes into the second section 40B, with a third region simultaneously entering the first section 30A.

The operation described above will be repeated until all the articles P1 are separated from the vulcanized sheet.

In summary, the thick external bridges 16 are formed integral with the body 15 of the sheet and the external flash 13 and disposed in and along the thin annular zone 14 so as to connect the external flash to the vulcanized sheet body. Those bridges 16 are effective to protect said annular zone 14 from being unintentionally broken. Thus, no annular articles will slip off the vulcanized sheet S1 when the sheet is taken off a mold or transported, thereby improving production efficiency.

Further, the thin annular zones 14 thus protected from breakage enable a higher accuracy in positioning the annular articles P1 relative to the sheet S1, whereby said articles free from any defect in shape or dimension can now be produced.

The recess 22 formed in each inner waste 20 is engageable with the guide lug 34 to facilitate exact positioning and removal of each inner waste. Each annular article P1 is also positioned correctly in a similar manner when it is torn off the vulcanized sheet. Such a precise positioning of those inner wastes and annular articles contributes to a higher quality of products.

Since a sufficient gap is provided between the outer periphery of the first punch 35 and the inner periphery of each annular article P1, and also a sufficient gap is provided between the inner periphery of the round hole 31A (serving as the second die) in the sheet holding plate 31 and the outer periphery of said article P1, neither the inner waste 20 nor the annular article itself will erroneously be cut by the shearing punch 35 or 45 and the dies. In other words, only the inner and outer breakable boundaries 12 and 26 will be torn, even if a slight misalignment would take place between any punch 35 or 45 and the article P1. Therefore, a considerable roughness will be allowed in positioning of the articles and in manufacture of the punches, dies and other members, and a simpler and less expensive apparatus may be employed.

In addition, an easier and not excessively precise positioning will be permitted in placing the sheet onto the sheet holding plate, so that the finished annular articles of a higher quality are obtained more efficiently even if a number of the articles P1 are severed simultaneously from said sheet S1, or even if two or more rows of said articles arranged fore and aft in the transportation direction are subjected to the first step of removing the inner wastes and to the second step of severing the annular articles from the sheet.

The apparatus provided herein does not rely on any sharp edges such as blades, so that the punches and dies used in the present apparatus need not be so acute as to give a damage to the annular articles.

Figure 9:
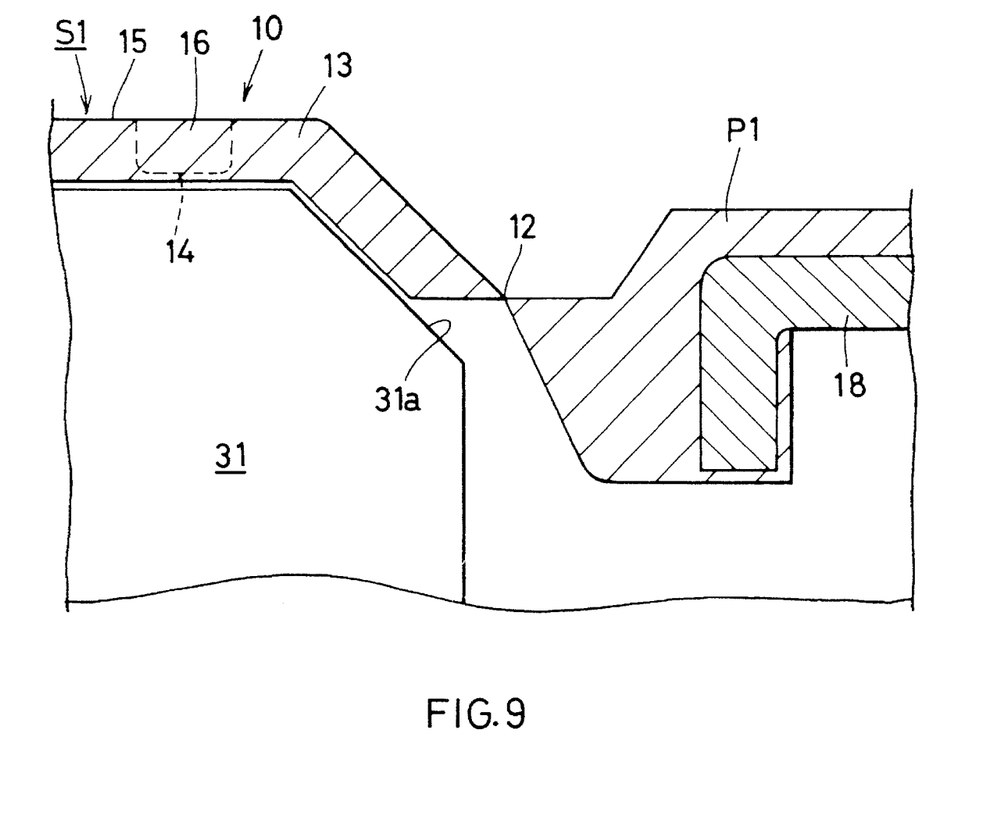
FIG. 9 is a cross section of a part of the vulcanized sheet in another embodiment, wherein the external flash is modified.

An inner peripheral portion of each external flash 13 may be tapered as shown in FIG. 9 in order that the flash can engage with the similarly tapered round hole 31A of the sheet holding plate 31. In this case, the sheet regions where the annular articles are disposed will be positioned more easily and more accurately.

What is claimed is:

1. A vulcanized sheet comprising:
   annular rubber articles separable from the sheet and distributed over a plane body of the sheet;
   an outer waste formed around each article;
   an inner waste formed inside the article;
   an outer breakable boundary between the outer waste and an outer periphery of the article;
   the outer waste consisting of:
   an external flash surrounding the outer boundary;
   a thin annular zone intervening between the external flash and the body and being of such a thickness as preventing a vulcanization pressure from escaping; and
   thick external bridges formed integral with the body and the flash and disposed in and along the annular zone at regular angular intervals;
   an inner breakable boundary between the inner waste and an inner periphery of the article; and
   a recess formed centrally of the inner waste and engageable with a positioning means.

2. A vulcanized sheet as defined in claim 1, further comprising thick internal blocks formed integral with the inner waste and arranged at regular angular intervals, wherein each block extends from a region near the inner boundary and along and inside a side wall of the recess so as to terminate at a bottom of the sheet.

3. A vulcanized sheet as defined in claim 2, wherein a bottom of the recess is thicker than the inner breakable boundary.

4. A vulcanized sheet as defined in claim 2, wherein the number of the thick internal blocks is three or more.

5. A vulcanized sheet as defined in claim 2, wherein each thick internal block is 0.5–5.0 mm wide and 0.3–1.0 mm thick.

6. A vulcanized sheet as defined in claim 1, wherein the number of the thick external bridges is five or more.

7. A vulcanized sheet as defined in claim 1, wherein each thick external bridge is 0.5–5.0 mm wide and 0.3–1.0 mm thick.

* * * * *